E. A. Godfrey,
Soldering Knives.
N° 28,715.  Patented June 12, 1860.
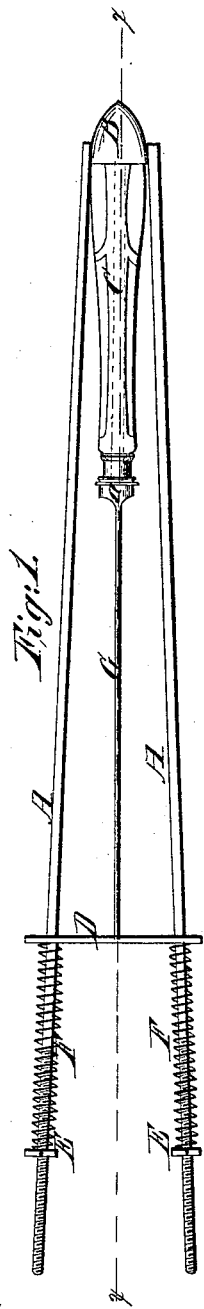
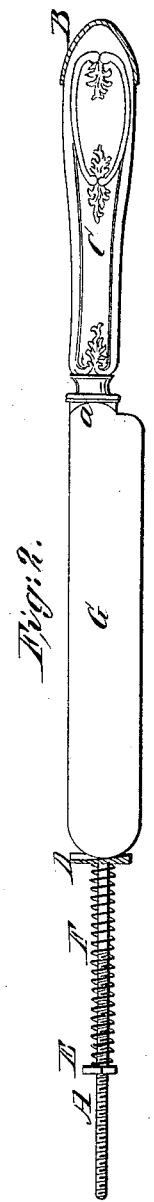
Witnesses:
Inventor:
Edward Godfrey,

UNITED STATES PATENT OFFICE.

EDWARD A. GODFREY, OF HARTFORD, CONNECTICUT, ASSIGNOR TO ROGERS, SMITH & CO., OF SAME PLACE.

IMPROVEMENT IN SOLDERING HANDLES OF CUTLERY.

Specification forming part of Letters Patent No. 28,715, dated June 12, 1860.

*To all whom it may concern:*

Be it known that I, EDWARD A. GODFREY, of Hartford, in the county of Hartford and State of Connecticut, have invented a new and useful Device for Holding Metal Handles on the Tangs of Cutlery while being Soldered thereto; and I do hereby declare that the following is a full, clear, and exact description of the same, reference being had to the annexed drawings, making a part of this specification, in which—

Figure 1 is a side view of my invention; Fig. 2, a longitudinal section of the same, taken on the line *x x*, Fig. 1.

Similar letters of reference indicate corresponding parts in the two figures.

The object of this invention is to obviate the necessity of wiring the handle on the tang as hitherto, in order to solder the handle to the tang and thereby effect a considerable saving in time and greatly facilitate the work.

The invention is applicable to metal handles, such as are most generally plated and formed of metal shells swaged or struck up in proper form and connected together by solder.

To enable those skilled in the art to make and use my invention, I will proceed to describe its construction and the necessary manipulation attending the employment of the same.

A A are two metal rods, which are attached at one end to a cap, B. This cap B is made of a form to receive the outer end of the handle C to be soldered on the tang of the implement. The cap may be of metal.

On the rods A A a metal plate, D, is fitted. This plate is of rectangular form, with holes through it—one near each end—for the rods A A to pass through, the plate being fitted loosely on the rods so that it may slide freely thereon. The rods A A have screw-threads cut on them at their outer ends, and nuts E E are fitted thereon—one on each rod—and on each rod A, between its nut E and the plate D, a spiral spring, F, is placed.

G is a knife-blade, the tang of which is fitted in the metal handle C, the interior of the handle having a piece of soft solder placed within it previous to the insertion of the tang. The outer end of the handle C is fitted in the cap B, and the plate D is drawn slightly outward, so that the plate G may be shoved inward at the inner side of the plate, and thereby allow the latter to be pressed against the blade by the springs F F, the latter causing the plate D to press sufficiently hard against the end of the blade to hold the blade and handle together. This device, it will be seen, forms a very convenient holder, for the knife and handle may be readily fitted in it, and by turning the nuts E E the implement may be graduated to suit articles of different lengths.

In the soldering of the tang and handle together the usual blow-pipe is used, and the manipulation, so far as the soldering is concerned, is precisely the same as heretofore— viz., the end of the handle at its junction with the bolster *a* being heated until the solder fuses, the knife being held in an inverted position, or nearly so.

The means hitherto employed for holding the handle on the tang has been the wiring of the handle to the bolster *a* of the knife or other article to which the handle is to be secured. This is a tedious mode of securing the handles on the tang, and consumes more time than the soldering of the handles to the tangs.

Having thus described my invention, what I claim as new, and desire to secure by Letters Patent, is—

The swivel-plate D, with the adjustable plate H, and rods F F attached, the whole being arranged to form a clamp, substantially as and for the purposes set forth.

EDWARD A. GODFREY.

Witnesses:
 WM. C. EVEREST,
 P. P. HOTCHKISS.